(12) United States Patent  
Kajikawa et al.

(10) Patent No.: US 7,830,642 B2  
(45) Date of Patent: Nov. 9, 2010

(54) DISC APPARATUS

(75) Inventors: Kazuki Kajikawa, Daito (JP); Futoshi Takeda, Daito (JP); Toshiaki Fukui, Daito (JP); Kazuhiro Ichikawa, Daito (JP); Kazuto Kitagawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 393 days.

(21) Appl. No.: 12/108,817

(22) Filed: Apr. 24, 2008

(65) Prior Publication Data

US 2008/0266700 A1 Oct. 30, 2008

(30) Foreign Application Priority Data

Apr. 25, 2007 (JP) ............................. 2007-115261

(51) Int. Cl.  
*H02H 5/04* (2006.01)

(52) U.S. Cl. .................... 361/30; 361/6; 361/7; 361/18; 361/23; 361/33; 361/42; 361/43; 361/86; 318/494; 318/798; 318/806; 318/808; 388/806; 720/695; 360/69; 369/53.3; 369/196

(58) Field of Classification Search ........................ None  
See application file for complete search history.

(56) References Cited

U.S. PATENT DOCUMENTS 6,489,738 B1 * 12/2002 Bates et al. ................. 318/434

6,876,531 B2 4/2005 Nakazawa et al.  
2008/0106815 A1 * 5/2008 Kajikawa ..................... 360/31  
2008/0164833 A1 * 7/2008 Kajikawa .................... 318/565

FOREIGN PATENT DOCUMENTS

JP 2003-174795 A 6/2003

* cited by examiner

*Primary Examiner*—Joseph H Feild  
*Assistant Examiner*—Ifedayo Iluyomade  
(74) *Attorney, Agent, or Firm*—Crowell & Moring LLP

(57) ABSTRACT

A disc apparatus which can judge accurately whether or not a spindle motor is at fault due to a short circuit is provided.

A disc apparatus (1) includes a spindle motor (3) which rotates a disc (2), a differential operational amplifier (5) which successively detects output voltages of the spindle motor (3), and a failure judgment unit (10) which calculates an average voltage of the plural output voltages and judges whether or not the spindle motor (3) is at fault in accordance with the average voltage and the output voltages. When counting number of occurrences of a specific state which indicates that one of the two output voltages detected successively is larger than the average voltage and other of the two output voltages is smaller than the average voltage, the failure judgment unit (10) judges that the spindle motor (3) is at fault. Consequently, the failure judgment unit (10) can rapidly and accurately judge the failure in the spindle motor (3) without the influence from the unexpected change of the output voltages.

4 Claims, 5 Drawing Sheets

DISC APPARATUS

BACKGROUND OF THE INVENTION

1. Field of the Invention

The present invention relates to a disc apparatus having a DC motor which rotates a disc.

2. Description of the Related Art

In a disc apparatus which rotates a disc such as CD, CD-R, DVD or the like by using a DC motor such as a spindle motor to record and reproduce images and so on, dust particles are sometimes generated due to an abrasion of a brush in the DC motor and cause a short circuit of a commutator in the DC motor. When the commutator is short-circuited, the spindle motor stops rotating, and the disc thereby stops rotating. When the disc stops rotating, a controller which controls the disc apparatus increases an output current of a drive IC which drives the DC motor to speed up a rotation speed of the spindle motor. The drive IC produces heat due to the increase of the output current. The heat may cause a malfunction of the drive IC and a large current flowing through an actuator. Moreover, when the disc stops rotating, the controller gets less able to obtain an accurate operation of the actuator. As a result, the controller forces the drive IC to operate to rotate the disc. In this case, the drive IC passes the large current through the actuator and consequently, a cover of the actuator sometimes burns.

In Japanese Laid-Open Patent Publication No. 2003-174795, there is a disclosure of a technique to detect a failure caused by a short circuit in a field-effect transistor which performs a drive control of a motor when the motor starts driving and stops.

Although the technique described in 2003-174795 enables the detection of the failure caused by the short circuit in the field-effect transistor, it does not enable a detection of a failure caused by a short circuit in a motor.

The present invention is to solve the problem described above, and an object of the present invention is to provide a disc apparatus having a spindle motor to rotate a disc which can judge accurately whether or not the spindle motor is at fault due to a short circuit and also prevent the spindle motor from driving in case of failure in the spindle motor due to the short circuit.

SUMMARY OF THE INVENTION

The above object of the present invention is to provide a disc apparatus which includes a DC motor which rotates a disc, a controller which controls a rotation of the DC motor, and a reproduction unit which reads out data recorded in the disc and performs a reproduction processing in accordance with the data, and further includes a detector which successively detects output voltages of the DC motor when the DC motor rotates the disc and a failure judgment unit which judges whether or not the DC motor is at fault in accordance with the output voltages, wherein the failure judgment unit calculates an average of the output voltages as an average voltage, counts number of occurrences of a specific state which indicates that one of the two output voltages detected successively is larger than the average voltage and other of the two output voltages is smaller than the average voltage as number of specific states, and judges whether or not the DC motor is at fault in accordance with the number of specific states, and the controller stops the DC motor in response to the judgment of the failure judgment unit that DC motor is at fault.

According to the above configuration, the detector successively detects the output voltages of the DC motor when the DC motor rotates the disc, and the failure judgment unit calculates the average of the plural output voltages as the average voltage and judges whether or not the DC motor is at fault in accordance with the case that one of the two output voltages detected successively is larger than the average voltage and other of the two output voltages is smaller than the average voltage. The controller stops the DC motor in response to the judgment of the failure judgment unit that DC motor is at fault. Consequently, it is possible to prevent the large electrical current resulting from the controller rotating the faulty DC motor from passing through the actuator, so that the trouble of the cover of the actuator burning can be prevented.

It is preferable that the detector detects the output voltages during a period when the DC motor rotates the disc and the reproduction unit performs the reproduction processing or during a pause after the reproduction unit stops reading out the data from the disc before restarting reading out the data.

According to the above configuration, the detector detects the output voltages during the period when the DC motor rotates the disc and the reproduction unit performs the reproduction processing or during the pause after the reproduction unit stops reading out the data from the disc before restarting reading out the data. Consequently, the controller does not need to rotate the DC motor just for the detector detecting the output voltages, so that the disc apparatus enables the rapid detection of the failure in the DC motor through the normal operation without putting the load on the controller.

It is more preferable that the detector detects the output voltages the predetermined number of times while the DC motor completes one rotation of the disc, and when the number of specific states counted by the failure judgment unit during one rotation of the disc made by the DC motor is equal to or larger than the predetermined number of times, the failure judgment unit judges that the DC motor is at fault.

According to the above configuration, the detector detects the output voltages the predetermined number of times while the DC motor completes the one rotation of the disc, and the failure judgment unit judges that the DC motor is at fault when counting the number of specific states equal to or more than the predetermined number of times while the DC motor completes one rotation of the disc. Consequently, the failure judgment unit can judge whether or not the DC motor is at fault accurately without the influence from the unexpected change of the output voltages due to the scratch on the disc or the wobbling rotation of the disc due to the decentering.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
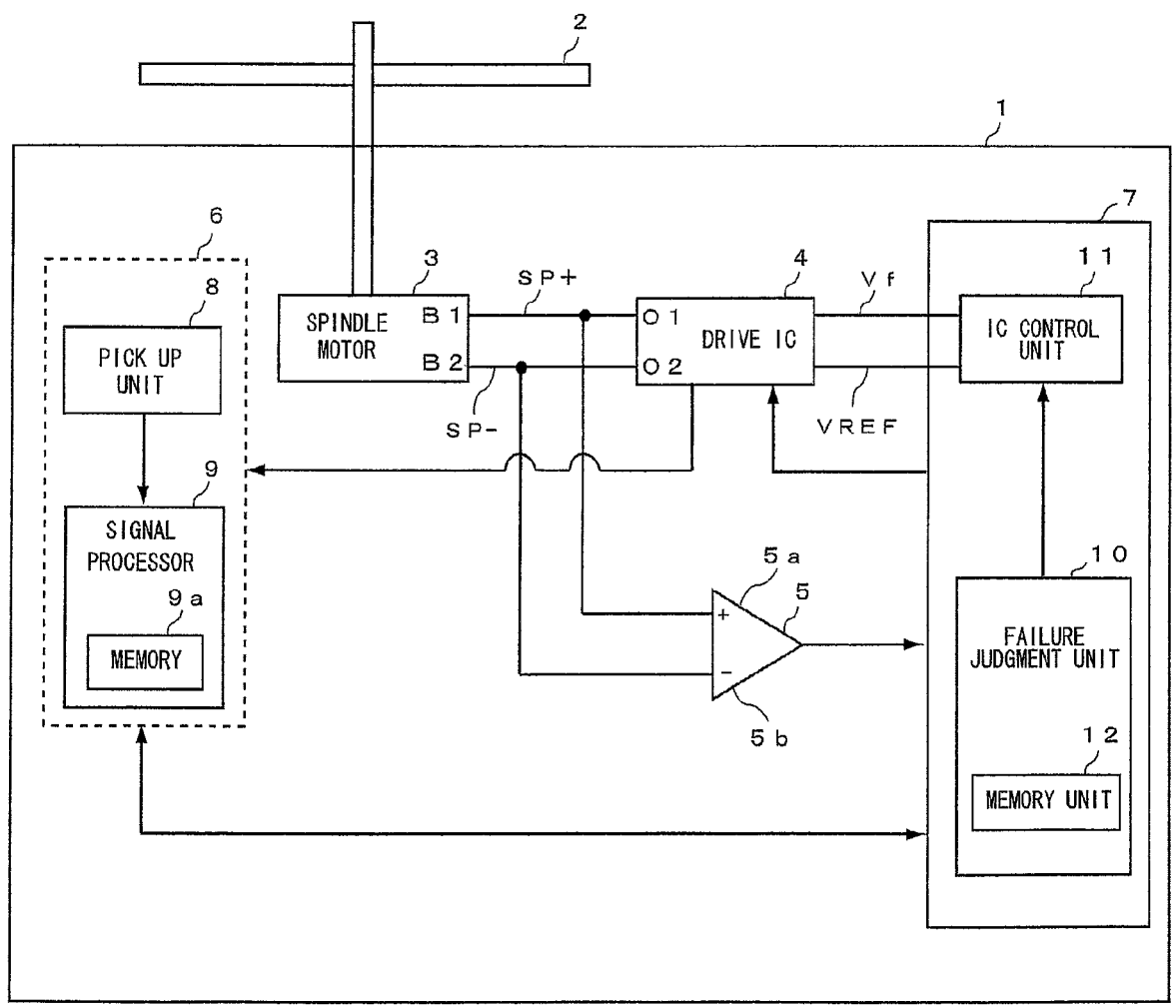
FIG. 1 is a schematic diagram of a disc apparatus according to a preferred embodiment of the present invention.

A disc apparatus according to a preferred embodiment of the present invention is described below with reference to FIGS. 1 to 5. FIG. 1 shows a schematic configuration of the disc apparatus according to the preferred embodiment of the present invention. A disc apparatus 1 includes a spindle motor 3 (DC motor) which rotates a disc 2, a drive IC 4 which drives the spindle motor 3, a differential operational amplifier 5 (detector) which is connected between the spindle motor 3 and the drive IC 4 to detect output voltages of the spindle motor 3, a reproduction unit 6 which performs a reproduction processing on the disc 2, and a controller 7 which controls the whole disc apparatus 1. The reproduction unit 6 has a pickup unit 8 which reads out data from the disc 2 and a signal processor 9 which performs a decoding on the data which the pickup unit 8 reads out. A failure judgment unit 10 has a memory unit 12 which can store plural output voltages detected by the differential operational amplifier 5. The differential operational amplifier 5 successively detects the output voltages at predetermined time intervals while the spindle motor 3 completes one rotation of the disc 2.

The controller 7 includes the failure judgment unit 10 which judges whether or not the spindle motor 3 is at fault based on the output voltages which are outputted from the differential operation amplifier 5 and an IC control unit 11 which controls the drive IC 4 in accordance with the judgment of the failure judgment unit 10. The signal processor 9 has a memory 9a which temporarily stores the data which the pickup unit 8 reads out from the disc 2. At this time, the disc 2 is CD or DVD, for example.

The IC control unit 11 provides a reference voltage VREF which is a reference voltage based on signals which are received from the pickup unit 8 to show the rotational state of the disc 2, and indicates a provision of an offset voltage Vf which shows a difference from the reference voltage to drive the spindle motor 3. The drive IC 4 has a terminal O1 and a terminal O2. The terminal O1 is connected to a brush B1 of the spindle motor 3 through a voltage supply line SP+, and the terminal O2 is connected to a brush B2 of the spindle motor 3 through a voltage supply line SP−. The drive IC 4 sets voltages of the terminal O1 and the terminal O2 based on the reference voltage VREF and the offset voltage Vf which are received from the IC control unit 11. A non-inverting input terminal 5a of the differential operational amplifier 5 is connected to the voltage supply line SP+ and an inverting input terminal 5b of the differential operation amplifier 5 is connected to the voltage supply line SP−. The differential operation amplifier 5 outputs the plural output voltages which are detected successively to the failure judgment unit 10.

The failure judgment unit 10 calculates an average of the plural output voltages received by the failure judgment unit 10 as an average voltage. At this time, a case that one of the two output voltages which are detected successively by the differential operational amplifier 5 is larger than the average voltage and other of the two output voltages is smaller than the average voltage is referred to as a specific state. The failure judgment unit 10 counts number of occurrences of the specific state while the spindle motor 3 completes the one rotation of the disc 2 as number of specific states. When the number of specific states counted by the failure judgment unit 10 during the one rotation of the disc 2 made by the spindle motor 3 is equal to or larger than the predetermined number of times, the failure judgment unit 10 judges that the spindle motor 3 is at fault due to the short circuit and then transmits a failure signal which indicates the failure in the spindle motor 3 to the IC control unit 11. At this time, the predetermined number is four, for example. When the IC control unit 11 receives the failure signal from the failure judgment unit 10, the IC control unit 11 instructs the drive IC 4 not to drive the spindle motor 3. Consequently, the spindle motor 3 which is at fault stops driving, and the large current flowing through the drive IC 4 is avoided, and thereby the trouble of the cover of the actuator burning can be prevented.

Figure 2:
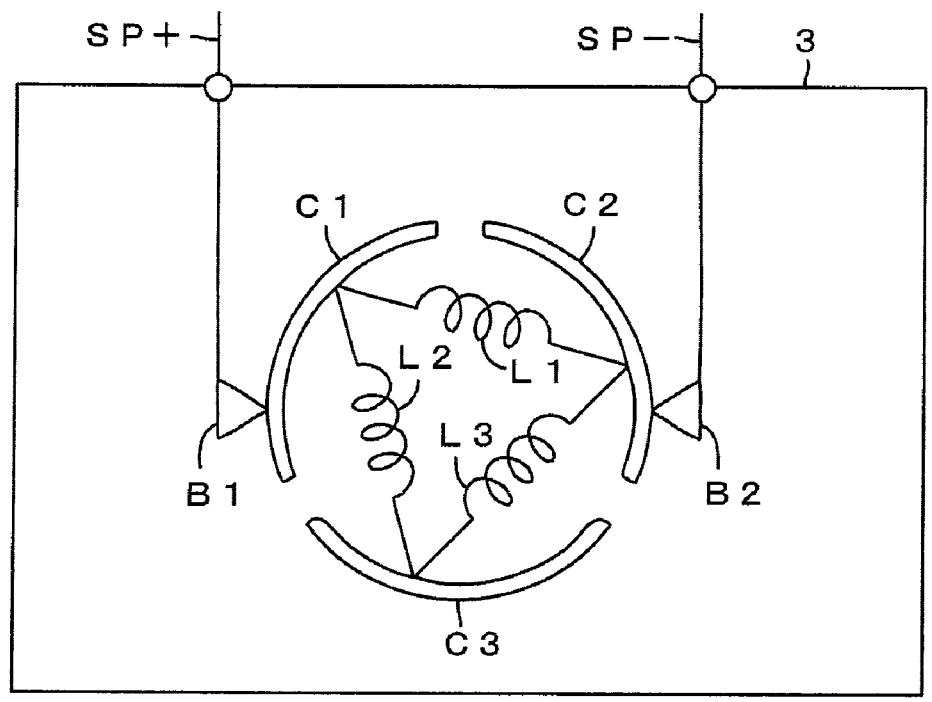
FIG. 2 is a schematic diagram of a spindle motor according to the present preferred embodiment.

FIG. 2 shows a schematic configuration of the spindle motor 3 according to the present preferred embodiment. The spindle motor 3 which is the DC motor includes the brush B1 which is a positive terminal, a brush B2 which is a negative terminal, commutators C1, C2, and C3, and coils L1, L2, and L3. The brush B1 is connected to the voltage supply line SP+, and the brush B2 is connected to the voltage supply line SP−. When the drive IC 4 provides DC (direct-current) voltage to the brush B1 and the brush B2 through the voltage supply line SP+ and the voltage supply line SP−, the DC electricity passes between the brush B1 and the brush B2 through part of the commutators C1, C2, and C3 and part of the coils L1, L2, and L3. The above configuration leads to the rotation of the spindle motor 3.

When the abrasion occurs on the brush B1 and B2 due to the rotation of the spindle motor 3, dust particles of the brush B1 and the brush B2 are generated. When the dust particles get into spaces among the commutators C1, C2, and C3, the short circuit occurs between the brush B1 and the brush B2. When there is the short circuit between the brush B1 and the brush B2, characteristics of the output voltages which are successively outputted from the differential operational amplifier 5 to the failure judgment unit 10 are different from that of the output voltages when there is no short circuit between the brush B1 and the brush B2. Consequently, the failure judgment unit 10 judges the failure in the spindle motor 3 by using the characteristics of the output voltages outputted from the differential operational amplifier 5. At this time, the short circuits in the two spaces or all of the three spaces among the commutators C1, C2, and C3 are designated as a dead short circuit. The short circuit in one of the three spaces among the commutator C1, C2, and C3 is designated as a partial short circuit. When there is the dead short circuit in the spindle motor 3, there is the short circuit constantly between the brush B1 and the brush B2, so that the commutators C1, C2, and C3 do not rotate. In contrast, when there is the partial short circuit in the spindle motor 3, the state that there is the short circuit between the brush B1 and the brush B2 and the state that there is no short circuit between the brush B1 and the brush B2 alternately arise according to the rotation of the commutators C1, C2, and C3.

Figure 3A:
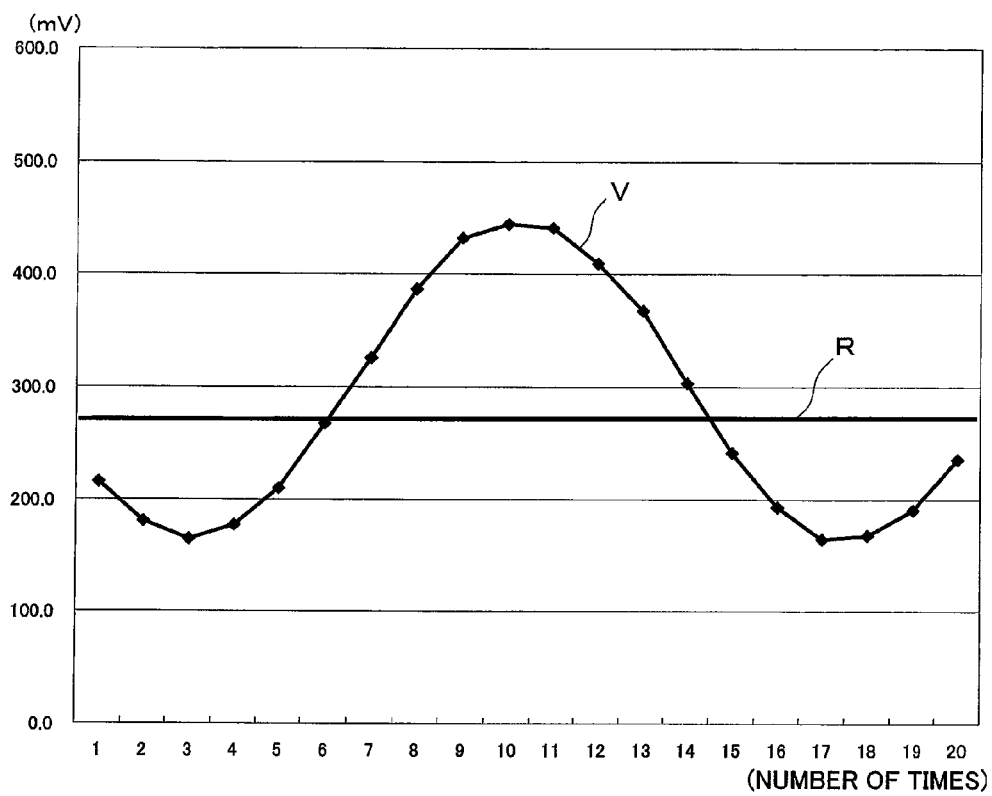
FIGS. 3A and 3B are diagrams showing variations of output voltages according to the present preferred embodiment.
Figure 3B:
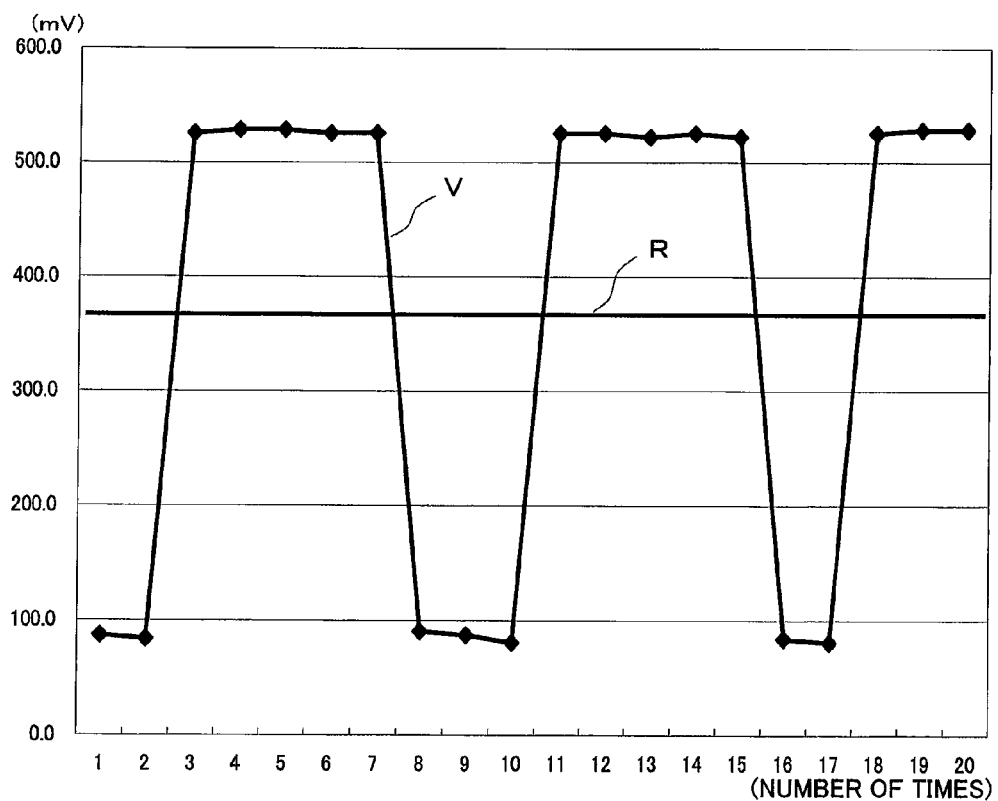

Subsequently, the output voltages in the present preferred embodiment are described. FIGS. 3A and 3B show the variations of the output voltages according to the present preferred embodiment. FIGS. 3A and 3B show the variation of the output voltages which are successively detected twenty times during the one rotation of the disc 2 made by the spindle motor 3 when the reproduction unit 6 reproduces data stored in an inner periphery side of the disc 2. FIG. 3A shows the variation of the output voltages of the spindle motor 3 which is not short-circuited, and FIG. 3B shows the variation of the output voltages of the spindle motor 3 which is partially short-circuited. In FIGS. 3A and 3B, a graph showing the variation of the output voltages is referred to as an output voltage variation graph, and a vertical axis indicates the output voltages, and a horizontal axis indicates the number of times that the output voltages are calculated.

In FIG. 3A, the output voltages detected twenty times are indicated by a voltage characteristic V, and an average voltage R of the output voltages detected twenty times is 275.9 mV. When the spindle motor 3 is not short-circuited, the voltage characteristic V is indicated by a Sin curve. At this time, an intersection of the voltage characteristic V and the average voltage R indicates the specific state by reason that one of the output voltages which are successively detected by the different operational amplifier 5 is larger than the average voltage R and other of the two output voltages is smaller than the average voltage R. In FIG. 3A, the voltage characteristic V intersects with the average voltage R at two points, so that the number of specified states occurred during the one rotation of the disc 2 made by the spindle motor 3 is two. At this time, the failure judgment unit 10 judges that the spindle motor 3 is at fault due to the short circuit when counting the number of specified states more than three times during the one rotation of the disc 2 made by the spindle motor 3, for example, so that the failure judgment unit 10 judges that the spindle motor 3 is not at fault.

In FIG. 3B, the output voltages detected twenty times are indicated by a voltage characteristic V, and an average voltage R of the output voltages detected twenty times is 371.4 mV. At that time, the spindle motor 3 is not short-circuited, thus the output voltages changes irregularly. As a result, the voltage characteristic V is not designated by the Sin curve. At this time, the voltage characteristic V intersects with the average voltage R at five points, so that the number of specified states occurred during the one rotation of the disc 2 made by the spindle motor 3 is five. At this time, the number of specified states is more than three, so that the failure judgment unit 10 judges that the spindle motor 3 is at fault.

Figure 4A:
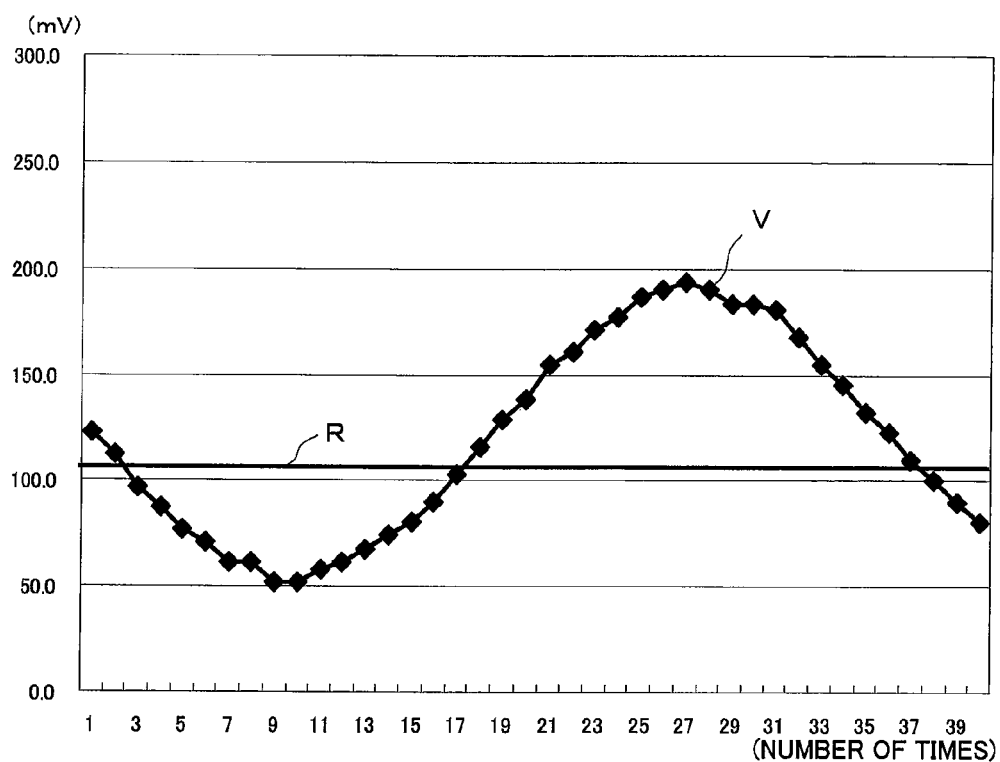
FIGS. 4A and 4B are diagrams showing variations of output voltages according to the present preferred embodiment.
Figure 4B:
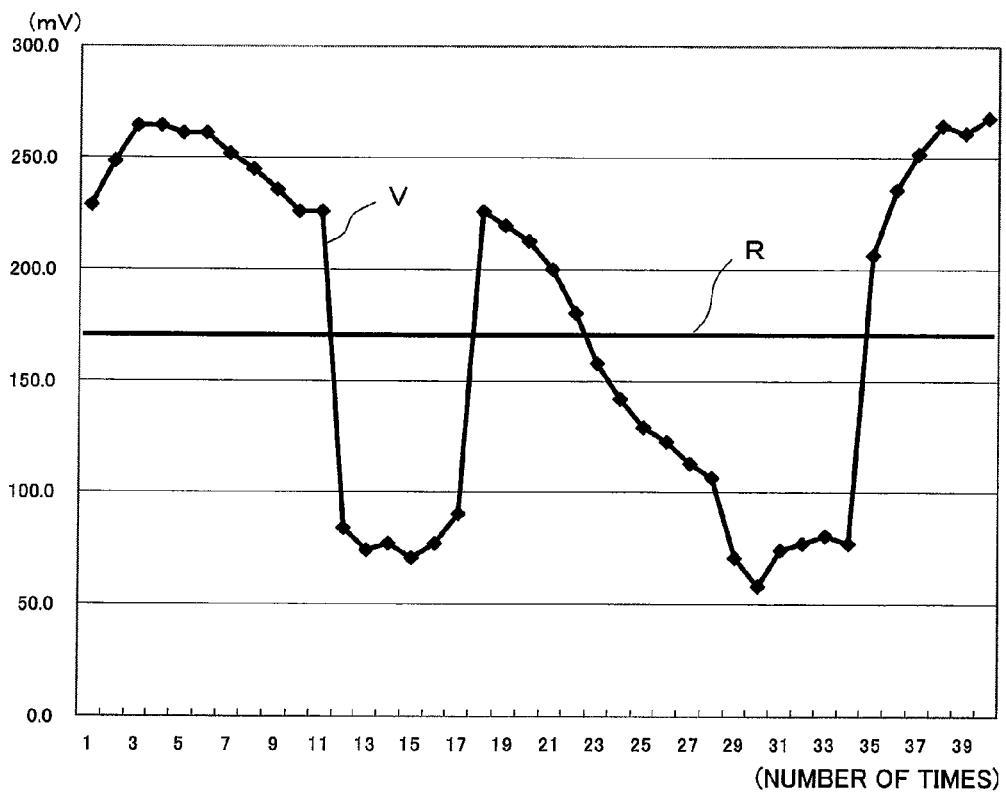

FIGS. 4A and 4B show the variations of the output voltages according to the present preferred embodiment. FIGS. 4A and 4B show the variation of the output voltages which are successively detected forty times during the one rotation of the disc 2 made by the spindle motor 3 when the reproduction unit 6 reproduces data stored in an outer periphery side of the disc 2. FIG. 4A shows the variation of the output voltages of the spindle motor 3 which is not short-circuited, and FIG. 4B shows the variation of the output voltages of the spindle motor 3 which is partially short-circuited. In FIGS. 4A and 4B, a graph showing the variation of the output voltages is referred to as an output voltage variation graph, and a vertical axis indicates the output voltages, and a horizontal axis indicates the number of times that the output voltages are calculated.

In FIG. 4A, the output voltages detected forty times are indicated by a voltage characteristic V, and an average voltage R of the output voltages detected forty times is 119.6 mV. In FIG. 4A, the voltage characteristic V intersects with the average voltage R at two points, so that the number of specified states occurred during the one rotation of the disc 2 made by the spindle motor 3 is three. At this time, the number of specified states is smaller than four, so that the failure judgment unit 10 judges that the spindle motor 3 is not at fault.

In FIG. 4B, the output voltages detected forty times are indicated by a voltage characteristic V, and an average voltage R of the output voltages detected forty times is 172.9 mV. At that time, the spindle motor 3 is short-circuited, thus the output voltages changes irregularly. As a result, the voltage characteristic V is not designated by the Sin curve. At this time, the voltage characteristic V intersects with the average voltage R at four points, so that the number of specified states occurred during the one rotation of the disc 2 made by the spindle motor 3 is four. At this time, the number of specified states is more than three, so that the failure judgment unit 10 judges that the spindle motor 3 is at fault.

Figure 5:
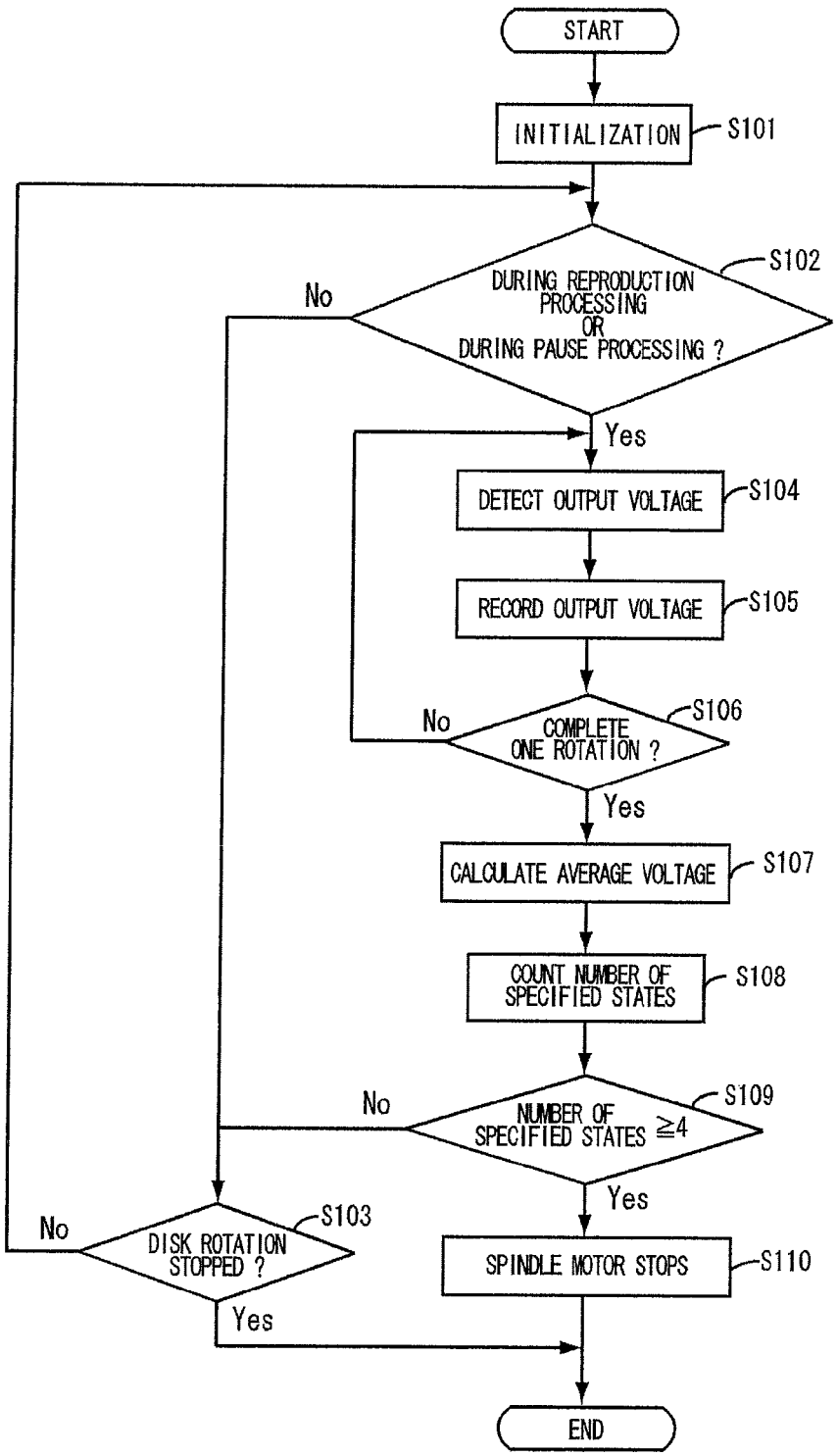
FIG. 5 is a flow chart for judging a failure according to the present preferred embodiment.

FIG. 5 shows the flow chart for judging the failure in the spindle motor 3 according to the present preferred embodiment. When the reproduction unit 6 starts the reproduction processing, the failure judgment unit 10 initializes contents stored in the memory unit 12 to make the memory unit 12 store the output voltage newly (S101). The controller 7 determines whether the reproduction unit 6 performs the reproduction processing or a pause processing when the spindle motor 3 rotates. At this time, the pause processing indicates that the pickup unit 8 stops reading out the data from the disc 2 when the spindle motor 3 rotates the disc 2. A speed of the decoding processing performed by the signal processor 9 is faster than a speed of the pickup unit 8 reading out the data from the disc 2. Consequently, the signal processor 9 makes the memory 9a store the data read out by the pickup 8 temporarily. When the memory 9a is full, the signal processor 9 instructs the controller 7 that the pickup unit 8 stops reading out the data from the disc 2. Consequently, the reproduction unit 6 performs the pause processing, and the pickup unit 8 waits ready until the free space is generated in the memory 9a.

When the controller 7 determines that the reproduction unit 6 does not perform the reproduction processing or the pause processing in step S102 (No in S102), the controller 7 detects whether or not the spindle motor 3 stops rotating (S103). The spindle motor 3 stops rotating when a user inputs an instruction to stop the rotation of the disc 2 or when a resume function which indicates that the rotation of the spindle motor 3 is stopped in case that the reproduction processing is not performed within a predetermined time is activated. When the rotation of the spindle motor 3 stops in the step S103 (Yes in S103), the disc apparatus 1 finishes the processing for judging the failure in the spindle motor 3. In contrast, when the rotation of the spindle motor 3 does not stop (No in S103), the controller 7 determines whether or not the reproduction unit 6 performs the reproduction processing or the pause processing (S102).

When the controller 7 determines that the reproduction unit 6 performs the reproduction processing or the pause processing in the step S102 (Yes in S102), the differential operational amplifier 5 successively detects the output voltages of the spindle motor 3 after detecting a first output voltage until the spindle motor 3 completes the one rotation of the disc 2 and outputs the detected output voltages to the failure judgment unit 10 (S104). The spindle motor 3 which is partially short-circuited outputs the output voltages which are not designated by the Sin curve during the one rotation of the disc 2. The failure judgment unit 10 can judge the failure in the spindle motor 3 when obtaining the plural output voltages which are outputted during the one rotation of the disc 2 made by the spindle motor 3. Consequently, the differential operational amplifier 5 according to the present preferred embodiment successively detects the output voltages more than nineteen times, for example, only during the one rotation of the disc 2 made by the spindle motor 3.

The failure judgment unit 10 makes the memory unit 12 store the output voltages inputted from the differential operational amplifier 5 (S105). The controller 7 judges whether or not the spindle motor 3 completes the one rotation of the disc 2 after the differential operational amplifier 5 detects the first output voltage (S106). When the spindle motor 3 does not complete the one rotation of the disc 2 (No in S106), the controller 7 makes the differential operational amplifier 5 detect the output voltages continuously (S104). In contrast, when the spindle motor 3 completes the one rotation of the disc 2 (Yes in S106), the controller 7 makes the failure judgment unit 10 calculate the average voltage (S107). In the step S107, the failure judgment unit 10 calculates the average of the plural output voltages stored in the memory unit 12 as the average voltage.

When calculating the average voltage, the failure judgment unit 10 counts number of occurrences of the specific state in the plural output voltages stored in the memory unit 12 as number of specific states (S108). When the number of specific states is smaller than four (No in S109), the failure judgment unit 10 judges that the spindle motor 3 is not at fault, and the controller 7 performs the processing of the step S103. In contrast, when the number of specific states is larger than three (Yes in S109), the failure judgment unit 10 judges that the spindle motor 3 is at fault. When the failure judgment unit 10 judges that the spindle motor 3 is at fault, the controller 7 stops the rotation of the spindle motor 3 (S110) and finishes the processing for judging the failure.

As described above, the failure judgment unit 10 judges whether or not the spindle motor 3 is at fault in accordance with the plural output voltages and the average voltage when the disc apparatus 1 performs the normal operation, so that it is possible to detect the failure in the spindle motor 3 rapidly without putting the large load on the controller 7. Moreover, controller 7 stops the spindle motor 3 in response to the judgment of the failure judgment unit 10 that the spindle motor 3 is at fault. Consequently, it is possible to prevent the large electrical current resulting from the controller 7 rotating the faulty spindle motor 3 from passing through the actuator, so that the trouble of the cover of the actuator burning can be prevented. Furthermore, the failure judgment unit 10 judges that the spindle motor 3 is at fault when counting the number of specified states more than three times during the one rotation of the disc 2 made by the spindle motor 3. Consequently, the failure judgment unit 10 can judge whether or not the spindle motor 3 is at fault accurately without the influence from the unexpected change of the output voltages due to the scratch on the disc or the wobbling rotation of the disc due to the decentering.

The present invention is not limited to the configuration of the above preferred embodiment, however, various modification are applicable, and for example, the disc apparatus 1 may have the failure judgment unit 10 separately from the controller 7 instead of having the failure judgment unit 10 in the controller 7. Moreover, the failure judgment unit 10 may judge that the spindle motor 3 is at fault when counting the number of specified states more than four times instead of counting the number of specified states more than three times.

What is claimed is:

1. A disc apparatus comprising:
a DC motor which rotates a disc;
a controller which controls a rotation of the DC motor, and
a reproduction unit which reads out data recorded in the disc and performs a reproduction processing in accordance with the data, further includes
a detector which successively detects output voltages of the DC motor when the DC motor rotates the disc and
a failure judgment unit which judges whether or not the DC motor is at fault in accordance with the output voltages, wherein
the failure judgment unit calculates an average of the output voltages as an average voltage, counts number of occurrences of a specific state which indicates that one of the two output voltages detected successively is larger than the average voltage and other of the two output voltages is smaller than the average voltage as number of specific states, and judges whether or not the DC motor is at fault in accordance with the number of specific states, and
the controller stops the DC motor in response to the judgment of the failure judgment unit that DC motor is at fault.

2. The disc apparatus according to claim 1, wherein the detector detects the output voltages during a period when the DC motor rotates the disc and the reproduction unit performs the reproduction processing or during a pause after the reproduction unit stops reading out the data from the disc before restarting reading out the data.

3. The disc apparatus according to claim 1, wherein the detector detects the output voltages the predetermined number of times while the DC motor complete one rotation of the disc, and
when the number of specific states counted by the failure judgment unit during the one rotation of the disc made by the DC motor is equal to or larger than the predetermined number of times, the failure judgment unit judges that the DC motor is at fault.

4. The disc apparatus according to claim 2, wherein the detector detects the output voltages the predetermined number of times while the DC motor complete one rotation of the disc, and
when the number of specific states counted by the failure judgment unit during the one rotation of the disc made by the DC motor is equal to or larger than the predetermined number of times, the failure judgment unit judges that the DC motor is at fault.

* * * * *